US010330835B2

(12) United States Patent
Downing et al.

(10) Patent No.: US 10,330,835 B2
(45) Date of Patent: Jun. 25, 2019

(54) FILTER ARRAY WITH REDUCED STRAY FOCUSED LIGHT

(71) Applicant: Materion Corporation, Mayfield Heights, OH (US)

(72) Inventors: Kevin R. Downing, Westford, MA (US); Michael J. Tatarek, Westford, MA (US)

(73) Assignee: MATERION CORPORATION, Mayfield Heights, OH (US)

( * ) Notice: Subject to any disclaimer, the term of this patent is extended or adjusted under 35 U.S.C. 154(b) by 208 days.

(21) Appl. No.: 15/337,281

(22) Filed: Oct. 28, 2016

(65) Prior Publication Data

US 2017/0123121 A1    May 4, 2017

Related U.S. Application Data

(60) Provisional application No. 62/250,272, filed on Nov. 3, 2015.

(51) Int. Cl.
*G02B 5/20* (2006.01)
*G02B 5/28* (2006.01)

(52) U.S. Cl.
CPC ............. *G02B 5/201* (2013.01); *G02B 5/285* (2013.01); *G02B 2207/123* (2013.01)

(58) Field of Classification Search
CPC ... G02B 5/201; G02B 5/285; G02B 2207/123
USPC ........................................................ 359/589
See application file for complete search history.

(56) References Cited

U.S. PATENT DOCUMENTS

| 2011/0096394 | A1* | 4/2011 | Liu | G03B 21/62 |
| | | | | 359/457 |
| 2014/0307309 | A1 | 10/2014 | Downing et al. | |
| 2014/0339615 | A1* | 11/2014 | Wang | H01L 27/14621 |
| | | | | 257/294 |

FOREIGN PATENT DOCUMENTS

| DE | 935 663 C | 11/1955 |
| JP | 2011 185781 | 9/2011 |

OTHER PUBLICATIONS

International Search Report and Written Opinion for International Application No. PCT/US2016/059335 dated Feb. 28, 2017.

* cited by examiner

*Primary Examiner* — Wen Huang
(74) *Attorney, Agent, or Firm* — Fay Sharpe LLP

(57) ABSTRACT

An apparatus is disclosed comprising an optical filter array including an array of optical filter elements; wherein each optical filter element has opposing mutually parallel principal faces connected by sidewalls including at least one pair of opposing trapezoidal sidewalls and at least one pair of opposing sidewalls that are not mutually parallel; and wherein the opposing mutually parallel principal faces of the filter elements collectively define optical entrance and exit apertures of the optical filter array and include interference filters. Further disclosed is a method of illuminating such a filter array.

8 Claims, 7 Drawing Sheets

FILTER ARRAY WITH REDUCED STRAY FOCUSED LIGHT

CROSS-REFERENCE TO RELATED APPLICATIONS

This application claims priority to U.S. Provisional Patent Application Ser. No. 62/250,272, filed on Nov. 3, 2015. The complete disclosure of this patent application is hereby fully incorporated by reference in its entirety.

BACKGROUND

The following relates to the optical arts, optical filter arts, spectrographic arts, pricing information distribution arts, and related arts.

Optical interference filters with high spectral selectivity comprise a stack of layers with alternating refractive index values. These filters can be designed to provide pass-band, stop-band, high-pass, low-pass, or notch filter output. The optical layers are typically deposited on a substrate plate that is optically transparent for the design basis spectrum—hence, the filter is sometimes referred to as a filter plate, and is optically uniform over the area of the plate.

On the other hand, an optical interference filter with different pass-bands or stop-bands or cutoff wavelengths in different areas of the plate is useful for diverse multi-spectral applications such as spectrometer or spectrum analyzer devices. Because it is difficult to controllably vary the layer thickness across the substrate plate during layer deposition, such a multi-spectral filter is sometimes manufactured as a so-called "butcher block" filter array. To build a butcher block filter array, a set of filter plates with different filter characteristics (e.g. different pass-band or stop-band wavelength and/or bandwidth) are formed by appropriate layer depositions. Each filter plate is designed to be uniform over the area of the plate. The filter plates are then diced to form filter elements in the form of strips which are then bonded together in a desired pattern to form the butcher block filter array. A two-dimensional filter array is manufactured by a similar process except that the filter plates are diced to form filter elements that are then bonded together in a desired two-dimensional array.

Some illustrative multi-spectral filter arrays of the foregoing type are described, for example, in Downing et al., U.S. Pub. No. 2014/0307309 A1 published Oct. 16, 2014, which is incorporated herein by reference in its entirety.

Some improvements are disclosed herein.

BRIEF DESCRIPTION

The present disclosure relates to an apparatus comprising an optical filter array including an array of optical filter elements; wherein each optical filter element has opposing mutually parallel principal faces connected by sidewalls including at least one pair of opposing trapezoidal sidewalls and at least one pair of opposing sidewalls that are not mutually parallel; also wherein the opposing mutually parallel principal faces of the filter elements collectively define optical entrance and exit apertures of the optical filter array and include interference filters.

The present disclosure is also directed to a method of providing the filter array noted above and illuminating the optical filter array with converging or diverging light having local angle comporting with sidewall angles of the sidewalls of the filter elements.

Additionally, the present disclosure is directed to an apparatus including an optical filter array comprising an array of interior optical filter elements which are not the outermost optical filter elements of the optical filter array; wherein each interior optical filter element has larger and smaller opposing mutually parallel principal faces connected by sidewalls including at least one pair of opposing trapezoidal sidewalls and at least one pair of opposing sidewalls that are not mutually parallel; and wherein the larger principal faces of the interior optical filter elements comprise a diverging aperture of the optical filter array and the smaller principal faces of the interior optical filter elements comprise a converging aperture of the optical filter array.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

In FIGS. 4-7 the number of illustrative optical filter elements is reduced to a 4×4 array to reduce drawing complexity.

DETAILED DESCRIPTION

Figure 1:
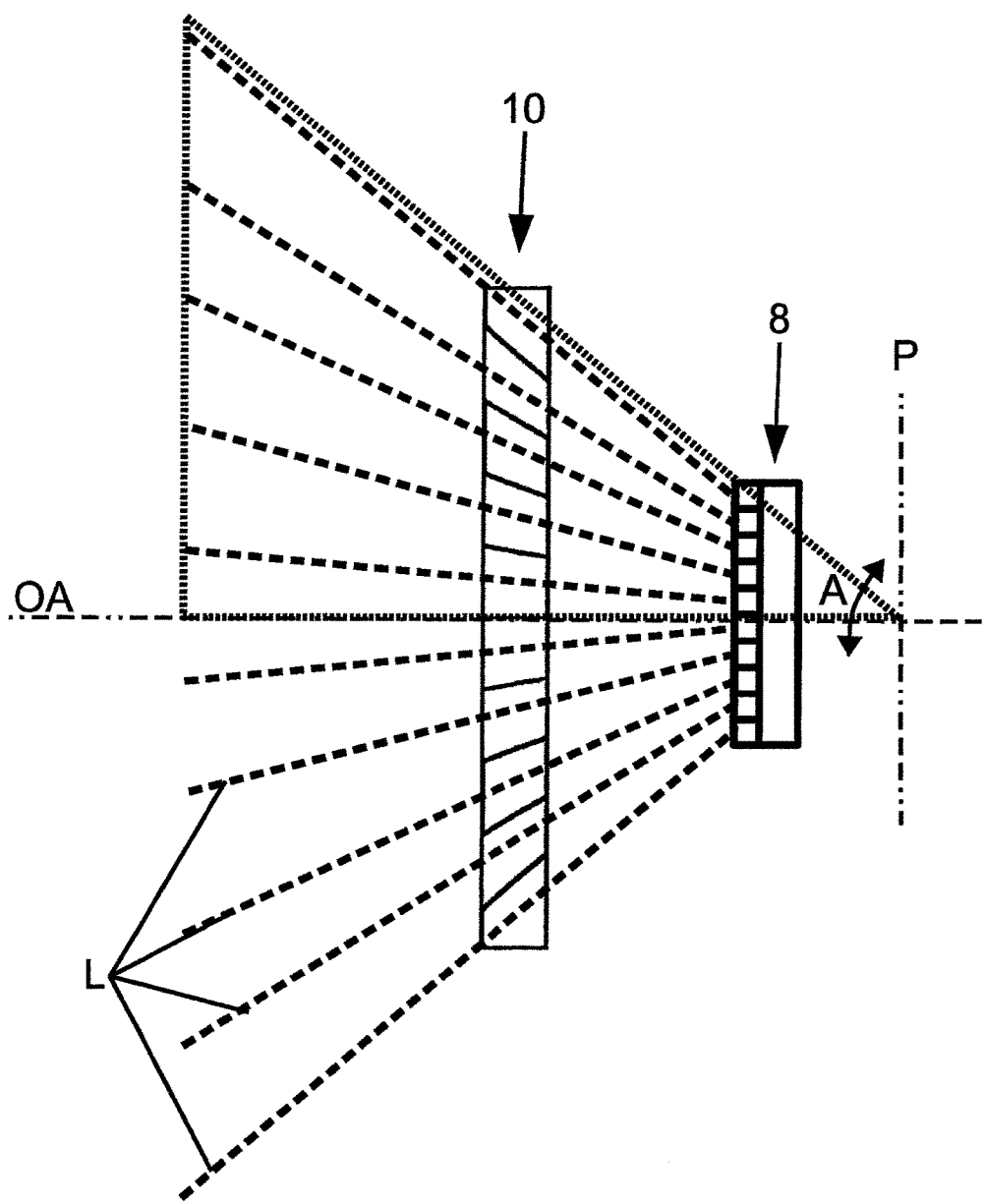
FIG. 1 diagrammatically shows a side-sectional view of a filter array for filtering converging light in conjunction with light ray tracings illustrating the converging light and a light detector array.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

With reference to FIG. 1, a disadvantage of butcher block type filter arrays recognized herein is that they do not comport with many practical optical systems having finite focal planes and operating on converging or diverging light beams. FIG. 1 illustrates light ray tracings for such a system having a focal plane P at a finite position along the optical axis OA. Due to the finite location of the focal plane P, light passing through the optical system (diagrammatically denoted by illustrative light rays L) forms a cone beam with cone half-angle A as indicated in FIG. 1, which converges at the focal plane P. In illustrative FIG. 1, the light rays L are traveling from left to right in the drawing, and are detected by a detector array 8 located in a plane close to the focal plane P—the light rays L are thus converging rays. Alternatively, if the light is traveling away from the finite focal plane, for example emanating from a compact light source at the focal plane, then the light rays may be diverging (alternative not shown). In either case, the light rays form a beam that is either converging (as illustrated) or diverging.

Butcher block type filter arrays are made up of filter elements in the form of strips (for one-dimensional arrays) or blocks (for two dimensional arrays) that are cut from filter plates. The dicing saw produces vertical sidewalls for the strips or blocks. Downing et al., U.S. Pub. No. 2014/0307309 A1 discloses an improvement for use when the angle-of-incidence of the light is not normal to the surface of the filter array. In designs disclosed in Downing et al, U.S. Pub. No. 2014/0307309 A1, the strips or blocks are diced with sidewalls at an angle chosen to comport with the angle of incidence of the light. This reduces light scattering and losses at boundaries between filter elements.

It is recognized herein that in the case of converging or diverging light, such a filter array produces light scattering and losses at the boundaries between adjacent filter elements. This scattering and optical loss cannot be reduced using the approach of Downing et al., U.S. Pub. No. 2014/0307309 A1, because there is no defined angle of incidence for the converging or diverging light.

Figure 2:
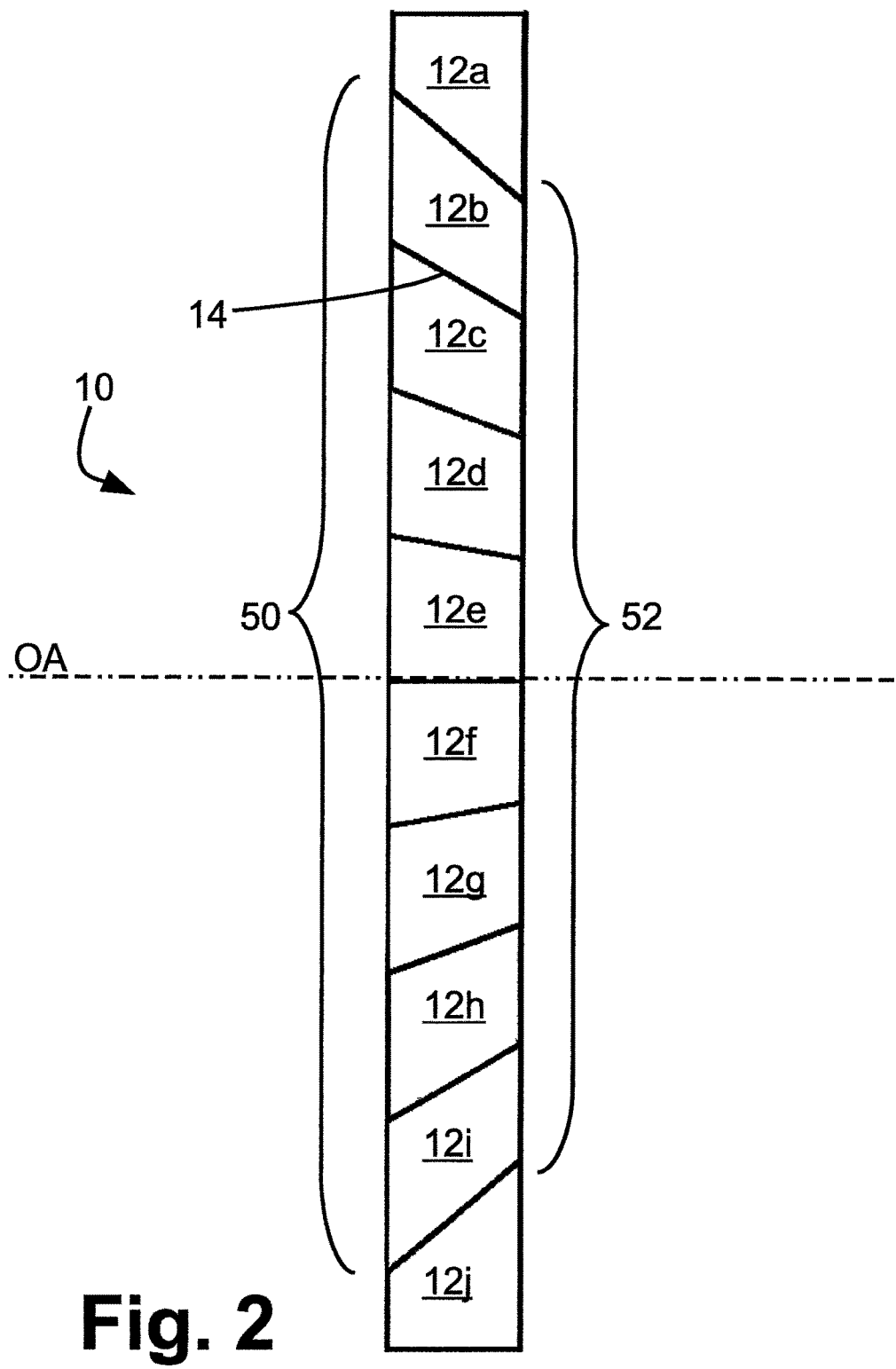
FIG. 2 diagrammatically shows an isolation side-sectional view of the optical filter array of FIG. 1.

With continuing reference to FIG. 1 and with further reference to FIG. 2, an improved optical filter array 10 has optical filter elements 12a, 12b, 12c, 12d, 12e, 12f, 12g, 12h, 12i, 12j with non-parallel sidewalls whose angles are designed, for each filter element (optionally excepting outer sidewalls of the outermost filter elements 12a, 12j which form the perimeter of the filter array 10), to match the local convergence or divergence angle of the light rays L. The joining sidewalls of adjacent filter elements are at the same local location on the surface of the filter array 10, and hence have the same sidewall angle. As recognized herein, this coincidence of neighboring sidewall angles allows the filter elements to be secured together at joining sidewalls, e.g. using an adhesive or other bond, to form the filter array 10. By way of illustration, as labeled in FIG. 2 at an interface 14 between filter elements 12b and 12c the joining side walls of the filter elements 12b and 12c have the same sidewall angle.

As further seen in FIGS. 1 and 2, the sidewall angle increases with increasing distance from the optical axis OA so as to conform with increasing angle of the converging or diverging light beam with increasing distance from the optical axis OA.

Figure 3:
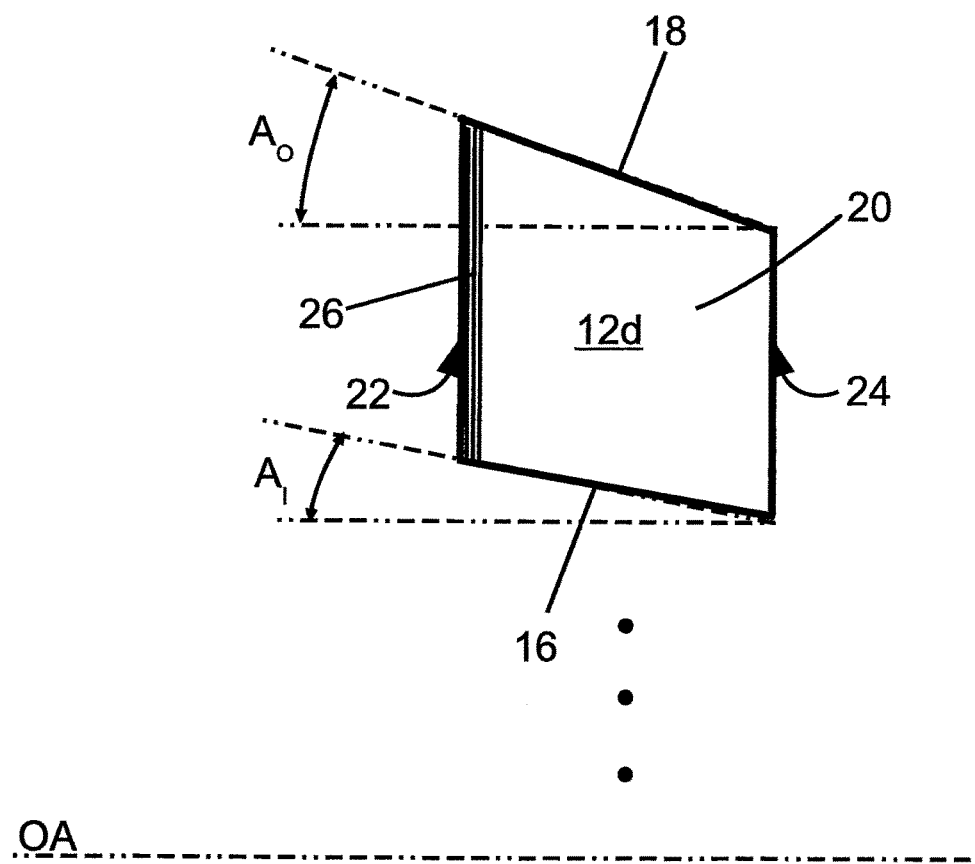
FIG. 3 diagrammatically shows an isolation side-sectional view of one illustrative optical filter element of the filter array of FIGS. 1 and 2.

With continuing reference to FIGS. 1 and 2 and with further reference to FIG. 3, the sidewalls of a given filter element are not mutually parallel. Rather, an inboard sidewall of a given filter element has a smaller sidewall angle than an outboard sidewall (where "inboard" and "outboard" indicate relatively closer to and relatively farther from the optical axis OA, respectively). By way of illustration, FIG. 3 shows the filter element 12d in isolation. For filter element 12d, an inboard sidewall 16 has a smaller sidewall angle $A_I$ (measured off the direction of the optical axis OA) as compared with the sidewall angle $A_O$ of an outboard sidewall 18.

With continuing reference to FIG. 3, for each filter element (e.g. illustrative filter element 12d) the filter element comprises a transparent substrate or body 20 bounded by four sidewalls 16, 18 (including two sidewalls additional to sidewalls 16, 18 which are not depicted in the side sectional view of FIG. 3) extending between opposing principal faces 22, 24. One or both of these principal faces includes an interference filter, e.g. illustrative principal face 22 of filter element 12d includes an interference filter 26, which may for example be deposited by a technique such as sputtering, vacuum evaporation, plasma deposition, or so forth. The interference film 26 is typically made up of a designed stack of layers providing optical interference to provide a design-basis pass-band, stop-band, high-pass, low-pass, or notch filter. The wavelength, full-width-at-half-maximum (FWHM), or other spectral characteristics of this interference filter 26 are designed for the particular application. Moreover, since the filter array 10 is typically a multi-spectral filter, each filter element 12a, 12b, 12c, 12d, 12e, 12f, 12g, 12h, 12i, 12j has, in general, a different interference filter (although some filter elements may be chosen to be identical—for example if the filter array 10 is intended to be symmetric about the optical axis OA, then the interference filters for filter elements 12a, 12j are identical; the interference filters for filter elements 12b, 12i are identical; the interference filters for filter elements 12c, 12h are identical; the interference filters for filter elements 12d, 12g are identical; and the interference filters for filter elements 12e, 12f are identical). Although not shown, an interference filter may additionally or alternatively be included on the principal face 24 of the filter element 12d.

The filter elements may, in general, be designed for any pass band or stop band in the ultraviolet, visible, or infrared wavelength range. By way of illustrative example, the filter elements (or more particularly the filter element body or substrate, e.g. filter element body or substrate 20 of the illustrative filter element 12d of FIG. 3) may be made of a light-transmissive material such as glass, sapphire, or another material having suitable transparency in the operational optical range. The interference filter 26 may include alternating layers of tantalum oxide ($Ta_2O_5$) and silicon dioxide ($SiO_2$), or more generally alternating layers of two (or more) materials with different refractive index values. The layers making up the interference filter 26 are also preferably light transmissive for the operational optical range, although since they are thin layers some optical absorption in the operational optical range may be acceptable. For example, by way of another illustrative example, the layers may be metal/metal oxide layers such as titanium/titanium dioxide ($Ti/TiO_2$). Known techniques for designing interference filters can be employed to design the layer thicknesses for a given pass-band or notch filter stop-band, or to provide desired high-pass or low-pass filtering characteristics.

FIGS. 1 and 2 depict the filter 10 in side sectional view. This side view does not capture the three-dimensional shape of the converging light L or of the filter array 10.

Figure 4:
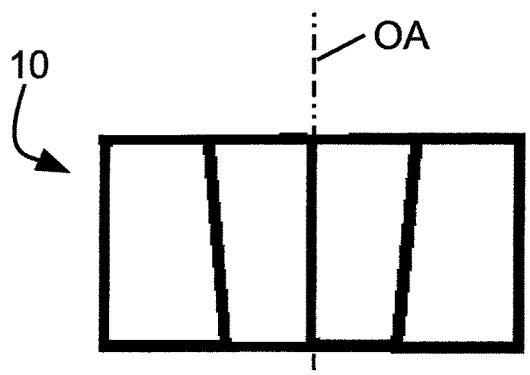
FIGS. 4, 5, 6, and 7 diagrammatically front side, top, right side, and perspective views, respectively, of the filter array of FIGS. 1 and 2.
Figures 5, 6:
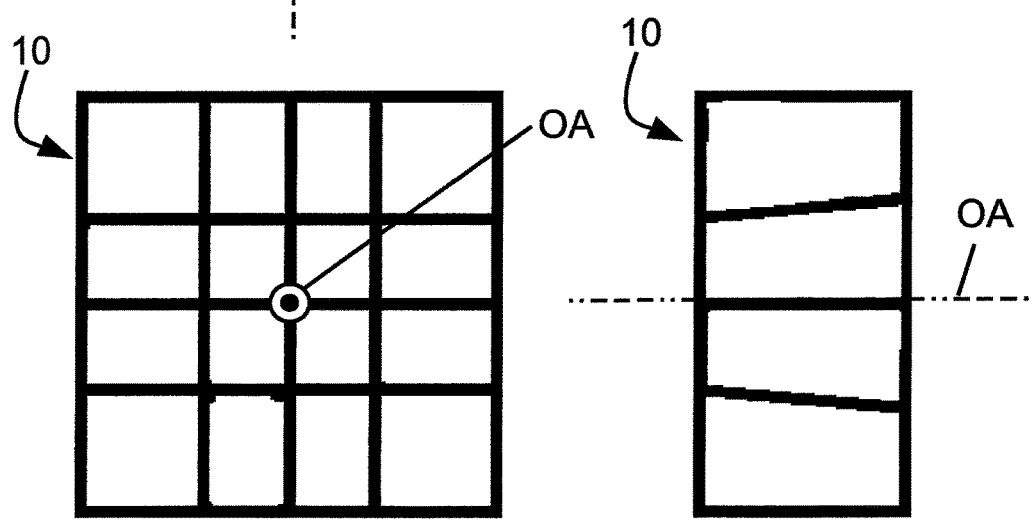
Figure 7:
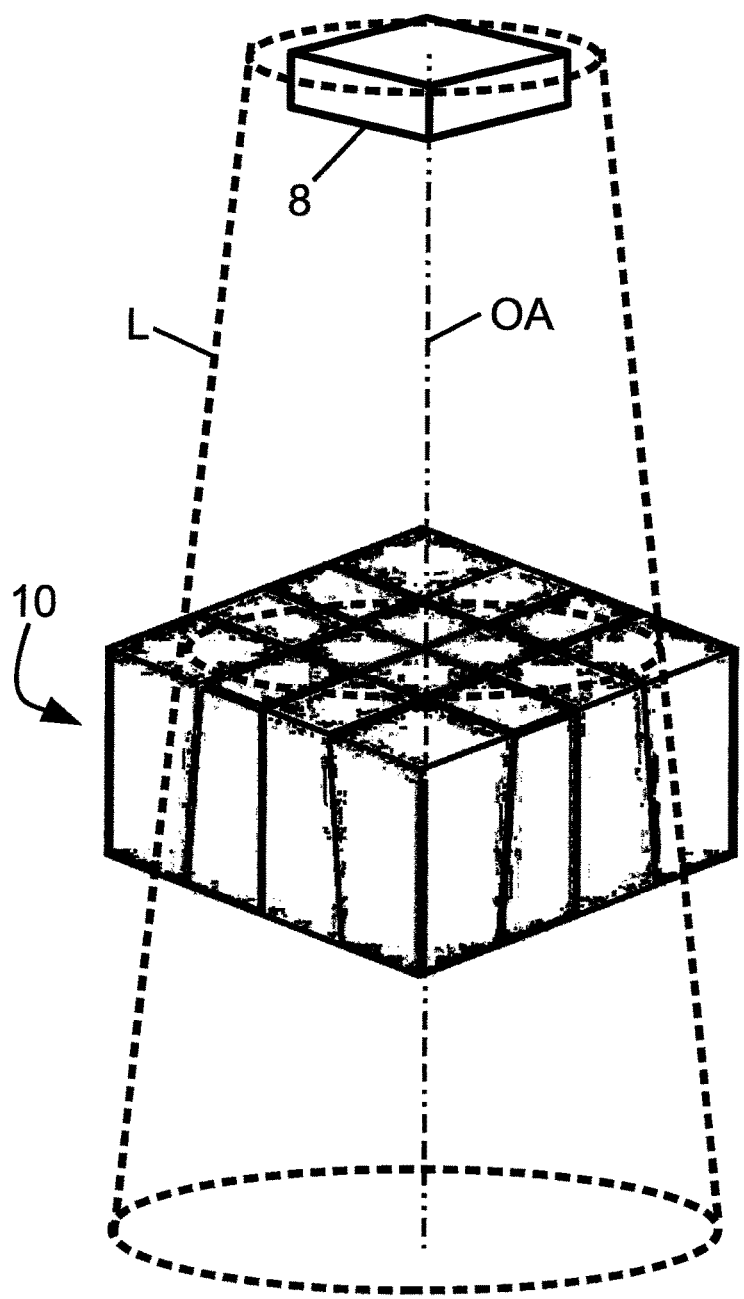
Figure 8:
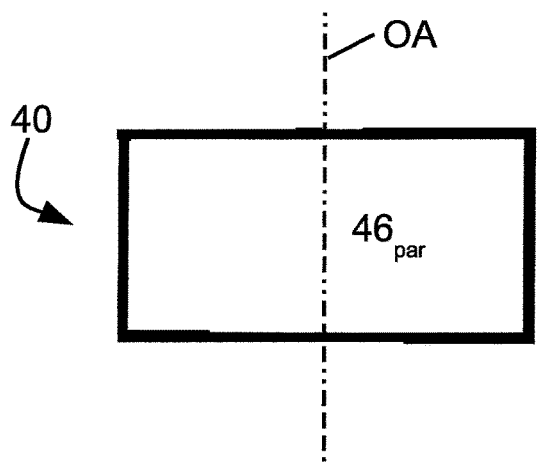
FIGS. 8, 9, 10, and 11 diagrammatically front side, top, right side, and perspective views, respectively, of a variant filter array for light that is converging or diverging in only one dimension, e.g. generated by an illustrated linear or cylindrical light source. As in FIGS. 4-7, in FIGS. 8-11 the number of illustrative optical filter elements is reduced to a 4×4 array to reduce drawing complexity.
Figures 9, 10:
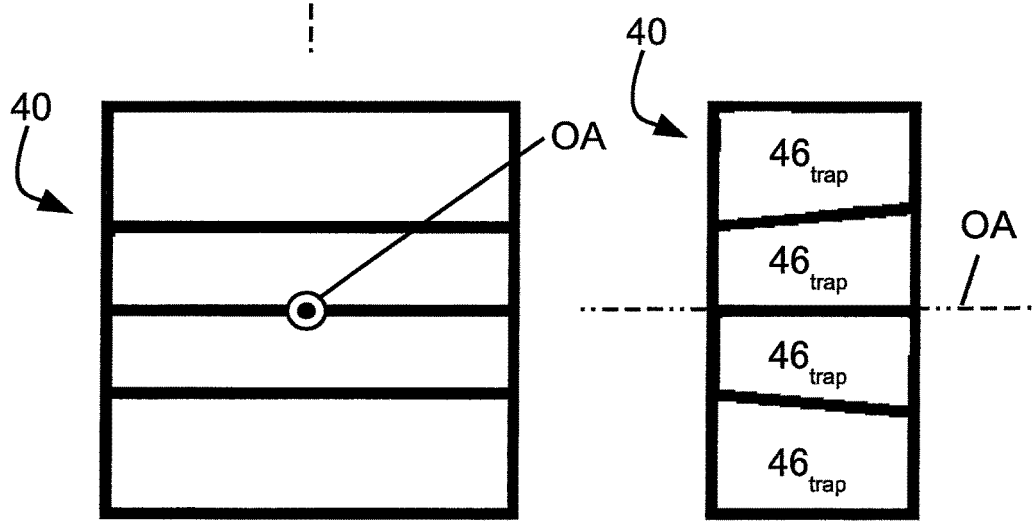

With reference to FIGS. 4-6, this three-dimensional shape is diagrammatically depicted by way of front side (FIG. 4), top (FIG. 5), and right side (FIG. 6) views of the filter 10, with FIG. 7 showing a perspective view of the filter 10 in its optical environment including the converging light beam L shown in perspective view and the detector array 8. In FIGS. 4-7, for diagrammatic simplicity the number of shown filter elements is reduced to a 4×4 array of filter elements. It will be appreciated that the number of filter elements is a design parameter suitably chosen based on the desired filter resolution and total area of the filter array.

The filter elements have the shape of a prismoid with (particularly referencing illustrative filter element 12d of FIG. 3) two mutually parallel bases 22, 24 (that is, the bases 22, 24 are parallel to each other) with the same number of vertices (four vertices for the rectangular bases 22, 24 of illustrative filter array 10) and at least two trapezoidal sidewalls 16, 18 which are not parallelograms (due to the different sidewall angles, e.g. the different angles $A_I$, $A_O$ for filter element 12d in illustrative FIG. 3). The two parallel bases 22, 24 of the filter elements in the assembled filter array 10 collectively define the optical entrance and exit apertures (or vice versa) of the filter array 10, as best seen in FIGS. 1 and 7.

With continuing reference to FIGS. 4-7 and with further reference to FIGS. 8-11, for a light beam that is diverging or converging two-dimensionally, all four sidewalls of a filter element are trapezoidal sidewalls, as best seen in FIGS. 4, 6, and 7. In these embodiments, each pair of opposing trapezoidal sidewalls (e.g. sidewalls 16, 18 of FIG. 3) are not mutually parallel (that is, are not parallel with each other). On the other hand, as seen in FIGS. 8-11, for a light beam that is diverging or converging in only one dimension and is parallel in the orthogonal dimension (for example, generated by a cylindrical or line light source 30) and which is to be multi-spectrally filtered only in the direction of divergence or convergence, a variant filter array 40 has filter elements in the form of strips, with each filter element having two end sidewalls $46_{trap}$ which are trapezoidal and long sidewalls $46_{par}$ that are parallelograms. In this embodiment, the two trapezoidal end sidewalls $46_{trap}$ are opposing sidewalls that are mutually parallel (that is, are parallel with each other), while the two parallelogram long sidewalls $46_{par}$ are opposing sidewalls that are not mutually parallel. The a linear or cylindrical light source 30 has a long axis 32 that is parallel with the long sidewalls $46_{par}$ of the filter elements and transverse to the trapezoidal end sidewalls $46_{trap}$.

Figure 11:
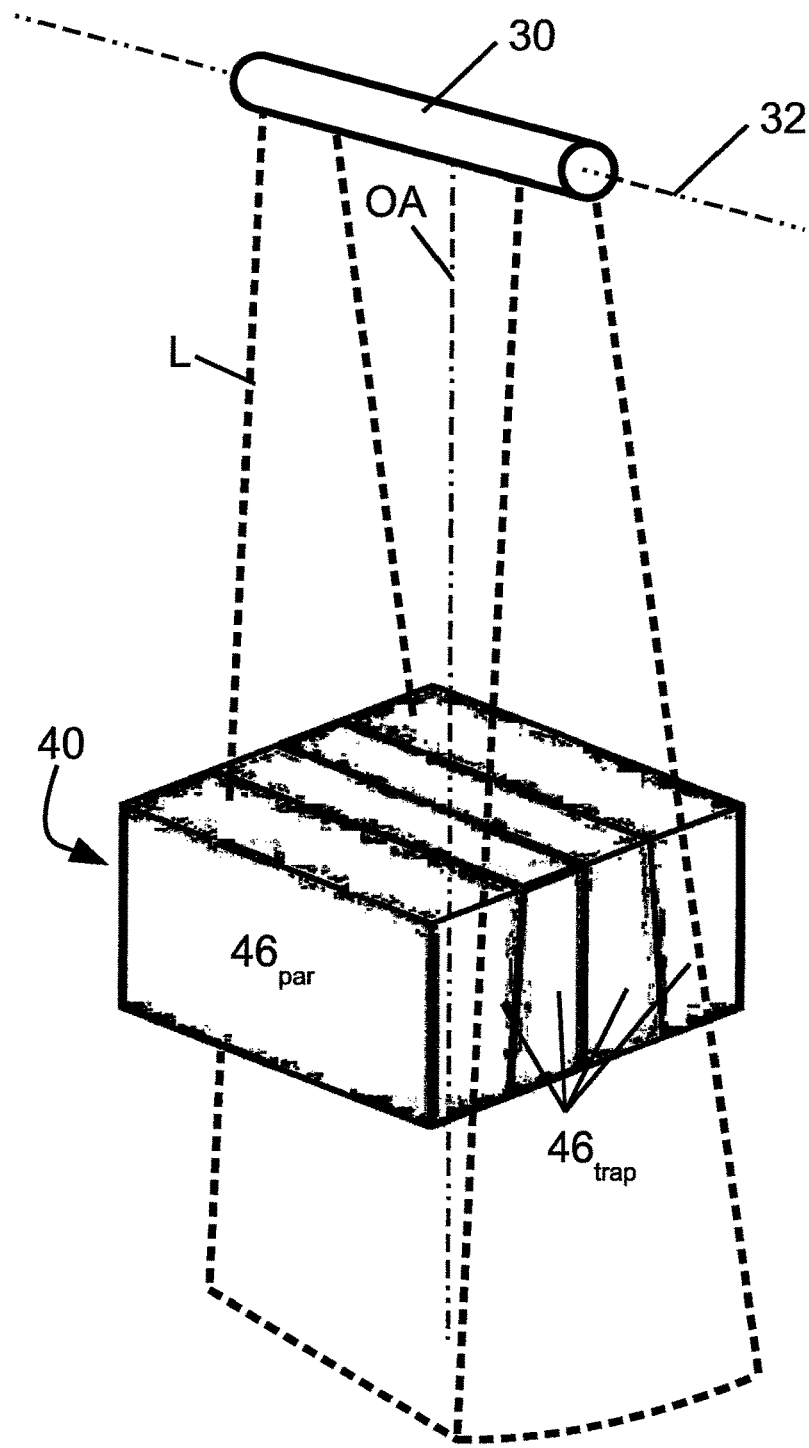

With reference back to FIGS. 1 and 2, in general, the interior filter elements (that is, the filter element 12b, 12c, 12d, 12e, 12f, 12g, 12h, 12i which are not the outermost filter elements 12a, 12j of the filter array 10) have one principal face (the principal face 22 of FIG. 3) which has larger area than the other principal face (the principal face 24 of FIG. 3). The larger-area principal faces of the interior filter elements collectively comprise a diverging aperture 50 of the filter array 10 (labeled in FIG. 2). The smaller-area principal faces of the interior filter elements collectively comprise a converging aperture 52 of the filter array 10. In FIGS. 1 and 2 the left side of the filter array 10 is the diverging aperture 50 while the right side of the filter array 10 is the converging aperture 52. If (as in illustrative FIG. 1) the filter is applied to converging light, then the diverging aperture is the entrance aperture (that is, the converging light is input to the diverging aperture 50) and the converging aperture is the exit aperture (that is, the converging light exits from the filter array 10 from the converging aperture 52). Conversely, if the filter is applied to diverging light (as is the case for the example of FIG. 11), then the converging aperture (the top aperture of the filter array 40 as shown in FIG. 11) is the entrance aperture and the diverging aperture (not visible in the perspective view shown in FIG. 11) is the exit aperture.

The outermost filter elements may be an exception to the foregoing geometry since they may optionally be "squared off" to have non-slanted perimeter sidewalls for the filter array 10 as a whole (this is seen in outermost filter elements 12a and 12j for which the left principal face is smaller than the right principal face), which can impact the area of the principal faces.

In designing the sidewall angles of the filter elements (e.g., angles $A_I$ and $A_O$ for illustrative filter element 12d of FIG. 3), the local angle of the diverging or converging light L at the sidewall is taken into account. This angle is preferably the angle in the material of the filter elements, rather than the angle in air, due to bending of light in accordance with Snell's law. The angle $\theta_{fe}$ of the light ray in the filter element material is related to the angle $\theta$ of the light ray in air by Snell's law, i.e $\sin(\theta)=n_{fe} \sin(\theta_{fe})$ where $n_{fe}$ is the refractive index of the filter element, and the ambient is assumed to be air, vacuum, or another ambient with refractive index n=1. For example, if the local light ray angle is $\theta=15°$ at the filter element sidewall and $n_{fe}=1.5$, then $\theta_{fe} \cong 10°$ and the sidewall at this location is suitably chosen as 10°. (If the ambient is oil or some other material with $n_{ambient}$ different from unity, then Snell's law generalizes to $n_{ambient} \sin(\theta)=n_{fe} \sin(\theta_{fe})$). The filter elements may be fabricated in various ways, such as by initially dicing parallelepiped filter elements and then grinding individual diced filter elements to form the sidewall angles. Alternatively, the dicing can employ suitably angled cutting saws or an angled wafer mounting jig.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. An apparatus comprising:
an optical filter array comprising an array of optical filter elements which includes an array of interior optical filter elements which are not the outermost optical filter elements of the optical filter array;
wherein each optical filter element has opposing mutually parallel principal faces connected by two pairs of opposing trapezoidal sidewalls in which the opposing trapezoidal sidewalls of each pair are not mutually parallel, and the opposing mutually parallel principal faces of each interior optical filter element include larger and smaller opposing mutually parallel principal faces connected by the two pairs of opposing trapezoidal sidewalls; and
wherein the larger principal faces of the interior optical filter elements collectively define a diverging optical aperture of the optical filter array and the smaller principal faces of the interior optical filter elements collectively define a converging optical aperture of the optical filter array.

2. The apparatus of claim 1 further comprising:
an optical system configured to generate converging or diverging light wherein at least one pair of opposing sidewalls of each filter element is aligned with a local angle of the converging or diverging light.

3. The apparatus of claim 1 wherein the optical filter elements comprise:
a plurality of optical filter elements of different optical filter types defined by different interference filters.

4. The apparatus of claim 1 wherein the interference filters of the optical filter elements comprise pass-band filters or notch filters.

5. A method comprising:
providing an optical filter array comprising an array of optical filter elements wherein each optical filter element has opposing mutually parallel principal faces connected by sidewalls including two pairs of opposing trapezoidal sidewalls in which the opposing trapezoidal sidewalls of each pair are not mutually parallel, and wherein the opposing mutually parallel principal faces of each interior optical filter element include larger and smaller opposing mutually parallel principal faces connected by the two pairs of opposing trapezoidal sidewalls, and wherein the opposing mutually parallel principal faces of the filter elements include interference filters; and
illuminating the optical filter array with converging or diverging light having local angle comporting with sidewall angles of the sidewalls of the filter elements.

6. The apparatus of claim 1 further comprising:
an optical system generating converging light that enters the optical filter array at the diverging optical aperture and exits the optical filter array at the converging optical aperture.

7. The apparatus of claim 1 further comprising:
an optical system generating diverging light that enters the optical filter array at the converging optical aperture and exits the optical filter array at the diverging optical aperture.

8. The apparatus of claim 1 wherein adjacent optical filter elements of the optical filter array are secured together at joining trapezoidal sidewalls.

\* \* \* \* \*